United States Patent [19]
Johnson

[11] 3,800,614
[45] Apr. 2, 1974

[54] DUAL LEVER CONTROL
[75] Inventor: Wayne E. Johnson, Schereville, Ind.
[73] Assignee: Allis-Chalmers Corporation, Milwaukee, Wis.
[22] Filed: Dec. 7, 1972
[21] Appl. No.: 312,840

[52] U.S. Cl.............. 74/473 R, 74/143, 74/480 R, 74/577 M
[51] Int. Cl............................................. G05g 11/00
[58] Field of Search.......... 74/473 R, 475, 476, 477, 74/480 R, 143, 577 M

[56] References Cited
UNITED STATES PATENTS
3,665,775   5/1972   Freeman ............................. 74/492
3,728,908   4/1973   Beiber ................................ 74/492

Primary Examiner—Allan D. Herrmann
Attorney, Agent, or Firm—Arthur L. Nelson

[57] ABSTRACT

A pair of levers pivotally mounted for pivotal movement about a common axis and interconnected by a ratchet means to incremently shift one lever by movement of the other lever operating the ratchet means.

10 Claims, 6 Drawing Figures

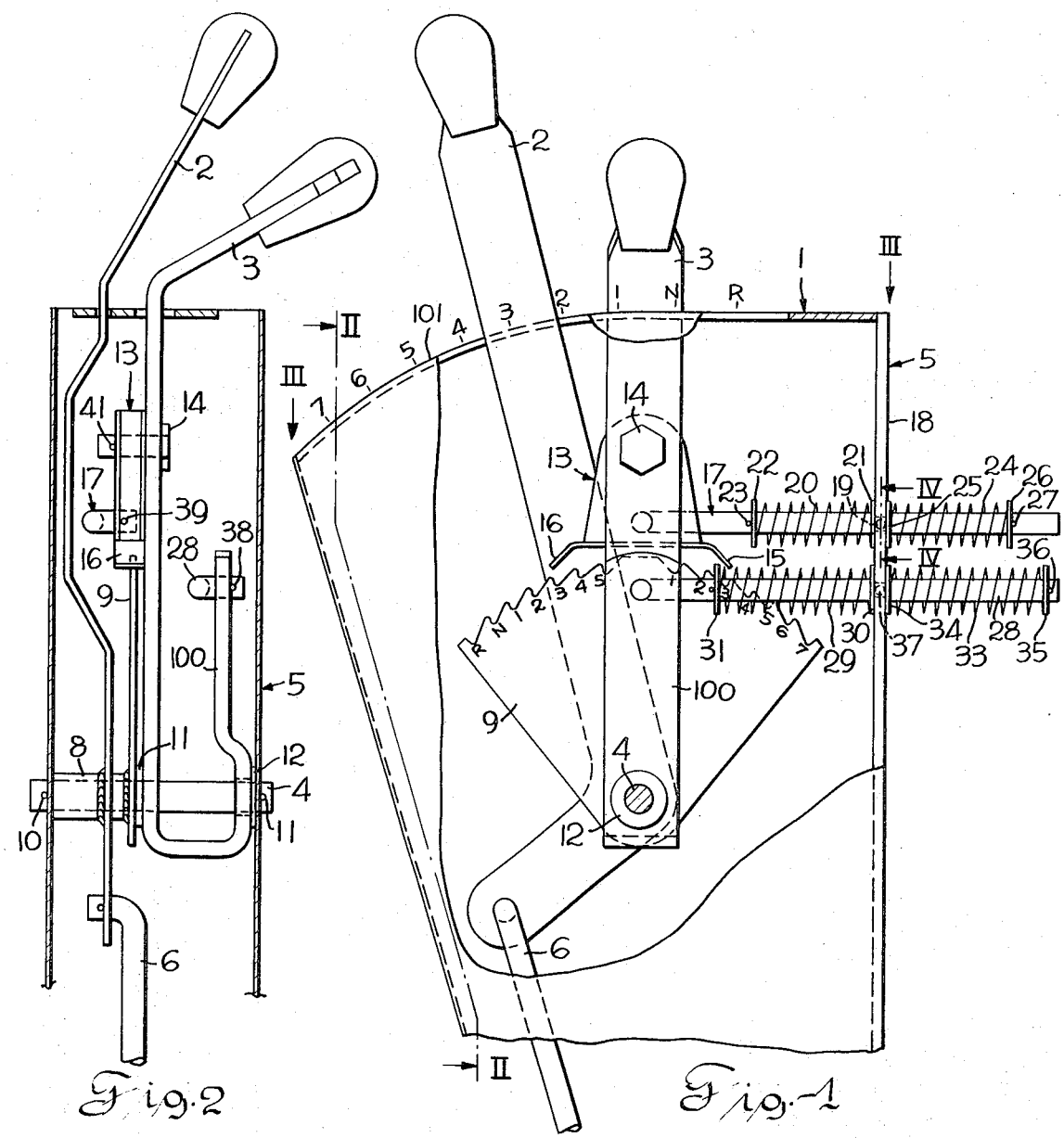
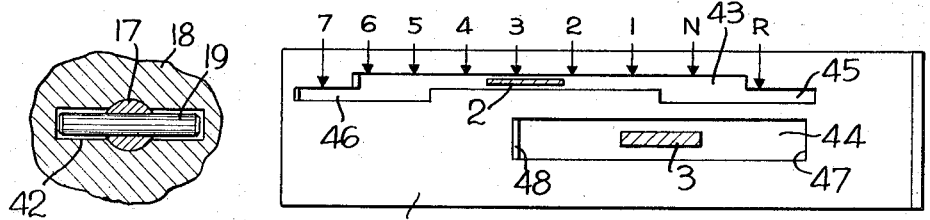

DUAL LEVER CONTROL

This invention relates to dual levers mounted on a bracket means for pivotal movement about a common axis with a clutch means interconnecting the levers and more particularly to a shift lever operated responsive to an auxiliary lever to limit the shifting movement to one speed ratio at a time.

The conventional vehicle has a shift lever which shifts the vehicle transmission through a plurality of speed ratios, including reverse. Many of the shift mechanisms, and particularly the mechanical gear shifting devices, include one or more shift rails and require that the shift lever be moved laterally to selectively pick up one of the shift rails. The power shift transmission can be shifted in a different shifting pattern. This shifting pattern may be the rotation of a single lever about a rotating axis whereby the angular displacement of the lever sequentially shifts through a sequence of speed ratios. With this type of a shift lever the opeator must use care when shifting because the movement of the tractor and the close shift positions of the shift lever may cause the operator to overshift into a higher or lower speed than desired. Accordingly, the use of an auxiliary lever provides a means whereby overshifting can be prevented and yet the shifting can be done rapidly, one speed ratio at a time. This is accomplished by the use of a single shift lever and an auxiliary lever operating in conjunction with each other whereby the auxiliary lever moves the shift lever in sequence one speed ratio for each movement of the auxiliary lever.

It is an object of this invention to provide dual levers for shifting a vehicle transmission.

It is another object of this invention to provide a transmission shift lever with an auxiliary lever to incremently move the shift lever one speed at a time.

It is a further object of this invention to provide a shift lever on a transmission with an auxiliary lever connected to the shift lever by a clutching means to sequentially move the shift lever for shifting of the transmission one speed ratio for each movement of the auxiliary lever.

The objects of this invention are accomplished by providing a shift lever for shifting a vehicle transmission. In conjunction with the shift lever an auxiliary lever is connected through a clutching means. As the auxiliary lever is moved in either direction it either shifts up or shifts down the transmission by operating the shift lever. The auxiliary lever can only shift the transmission one speed ratio for each movement of the auxiliary lever. If desired, any number of speed ratios can be shifted by manually moving the shift lever. This manner of shifting, however, is seldom done since it is desirable to gradually bring the vehicle up to speed or to downshift it gradually to prevent lurching and strain on the transmission due to sudden changes in the vehicle speed.

The preferred embodiment of this invention is illustrated in the attached drawings in which:

FIG. 1 is a side elevation view with a section broken away to illustrate the relative positions of the components of the shifting mechanism;

FIG. 2 illustrates a cross section view taken on line II—II of FIG. 1;

FIG. 3 is a partial section view taken on line III—III of FIG. 1;

FIG. 4 is a cross section view taken on line IV—IV of FIG. 1;

Figure 5:
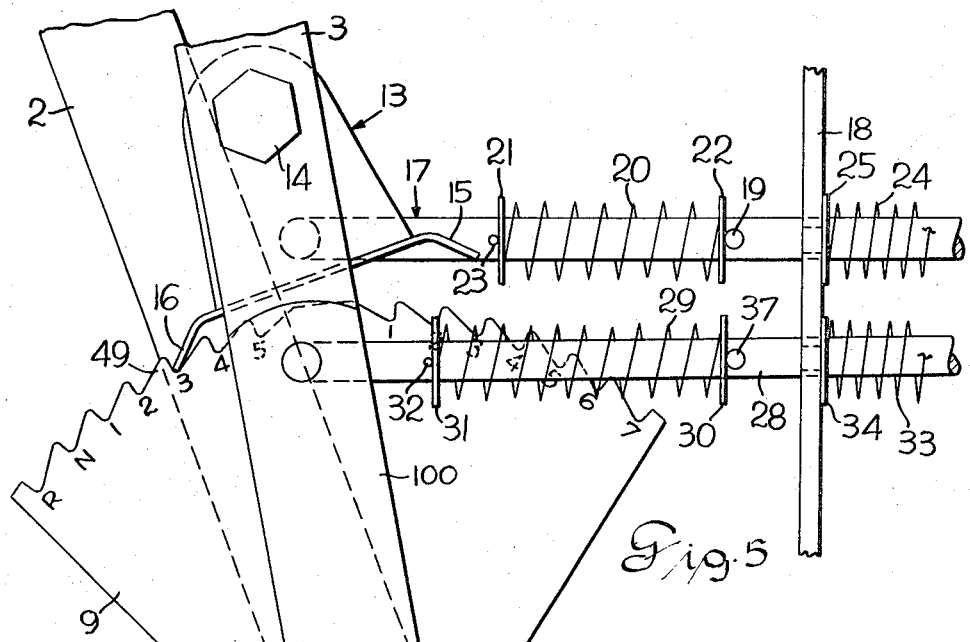
FIG. 5 is a fragmentary view of the shifting mechanism for shifting up the transmission speed.

Referring to FIG. 1, the shift mechanism is shown mounted in the control console 1. The shift mechanism includes the shift lever 2 and the auxiliary lever 3 pivotally mounted on the shaft 4 which is supported in the housing 5. The shift lever 2 is connected to a link 6 which in turn is connected to the shifting mechanism of the transmission 7. The shift lever 2 is mounted on a sleeve 8 and connected through the sleeve to ratchet 9. The sleeve 8 is rotatably supported on the shaft 4. The shft 4 is retained in position by the pins 10 and 11 in the shaft 4.

The auxiliary lever 3 is pivotally mounted on the shaft 4. The washers 11 and 12 are spaced between the auxiliary lever 3 and the sleeve 8 and the housing 5, respectively. The auxiliary lever 3 carries the pawl 13 pivotally mounted on the bolt 14. The pawl 13 forms engaging flanges 15 and 16 for shifting down the transmission or shifting up the transmission speed ratios, respectively. The pawl 13 is pivotally connected to the rod 17 which extends through the wall 18 of the housing 5. The pin 19 extends through the rod 17 and is shown positioned in the wall 18 in FIG. 1.

The pawl 13 is returned to its neutral position, as shown, by the spring 20 compressively positioned between the washer 21 and washer 22 which contact pin 19 and the pin 23 respectively. Similarly, spring 24 is compressively positioned between the washer 25 and washer 26. Washer 26 seats against the pin 27 while washer 25 is held against the pin 19 by the force of the spring 24. The opposing forces of the springs 20 and 24 maintain the pawl 13 in the neutral position as shown in FIG. 1.

The rod 28 is pivotally connected to the arm 100 of auxiliary lever 3 and extends through the wall 18 of the housing 5. Spring 29 is compressively positioned between the washers 30 and 31. Washer 31 seats on the pin 32 while washer 30 engages pin 37. Spring 33 is compressively positioned between the washer 34 and the washer 35. Washer 35 seats against the pin 36 while washer 34 engages pin 37. The pin 37 is positioned in a slot of the wall 18 of the housing 5 in the position shown in FIG. 1.

The pin 38 retains the rod 28 on the auxiliary lever 3 while the pin 39 retains the rod 17 in the pawl 13. Pin 41 retains the bolt 14 in position on the pawl 13.

FIG. 4 illustrates the pin 19 in the rod 17 in a slot 42 of the wall 18 of housing 5. Pin 19 is free to move through the slot as the auxiliary lever is operated. FIG. 3 illustrates a view of the top of the control panel with the levers shown in cross section. The slot 43 receives the shift lever 2, while the slot 44 receives the auxiliary lever 3. The slot 43 has an offset portion 45 to prevent the shift lever 2 from going into reverse without moving the lever transversely. Similarly the slot 46 is offset from the main portion of the slot 43 to prevent shifting into the road speed or the high gear ratio without the operator consciously moving the lever transversely when it is desired to shift into the high speed.

Slot 44 forms a stop 47 and a stop 48 for lever 3 at each end of the slot. This limits the rotational movement of the auxiliary lever 3 and prevents overshifting of the shift lever 2 since the auxiliary lever can only carry the shift lever 2 an increment of one speed ratio.

Referring to FIG. 5, the shifting mechanism is shown with the pawl 13 engaging a tooth 49 and moving the shift lever to shift up one speed ratio. It is noted that the spring 33 is biasing the rod 28 in the right hand direction causing the lever 3 to be biased in the same direction. The rod 17 is biased by the spring 24 in the right hand direction causing the pawl 13 to seat against the tooth 49 as the lever 3 is rotated in a counterclockwise direction. The lever 3 through the force on the pawl 13 carries the shift lever 2 in a counterclockwise direction as well. Its movement, however, is limited by the stop 48 shown in FIG. 3. The shift lever 2 has moved in the counterclockwise direction one speed ratio of the transmission when the auxiliary lever 3 engages the stop 48.

When the auxiliary lever 3 is released, the springs 33 and 24 automatically return the auxiliary lever 3 and pawl to the neutral position as shown in FIG. 1.

Figure 6:
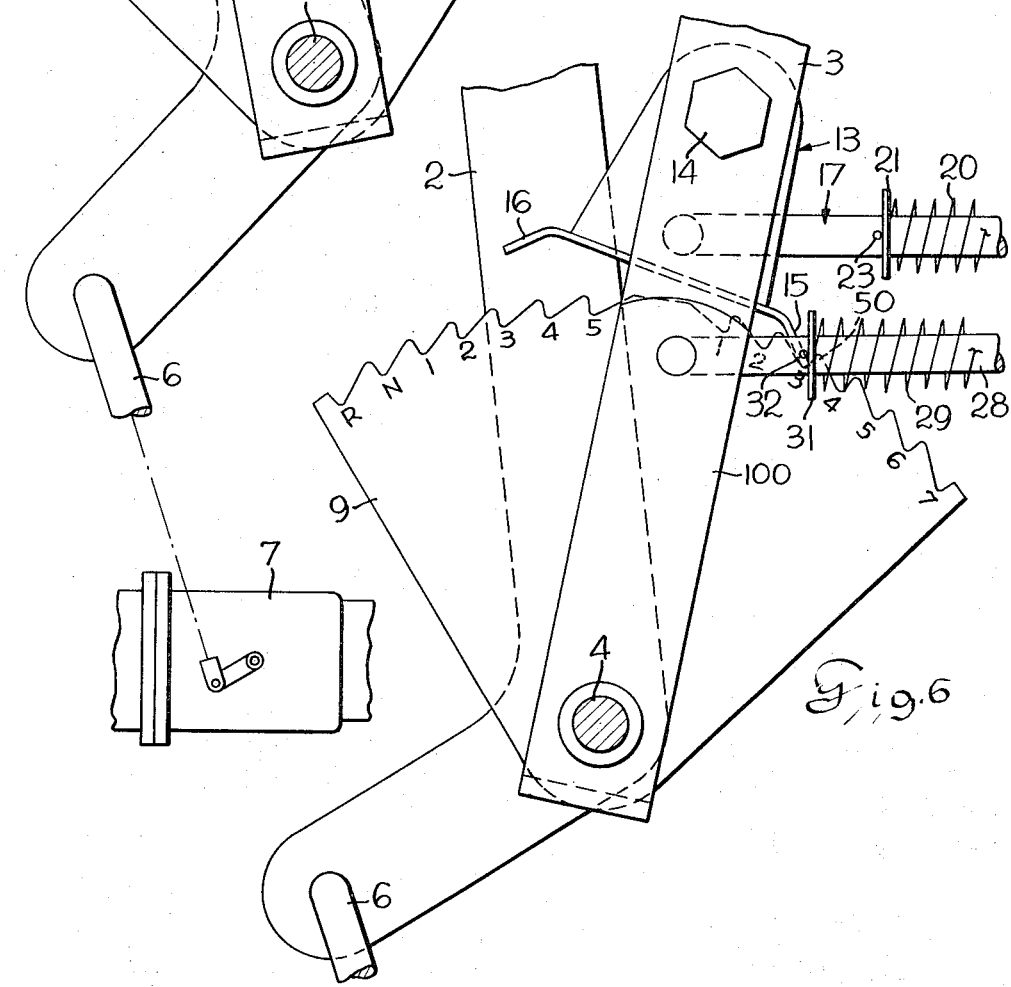
FIG. 6 is a fragmentary section showing a shifting mechanism shifting down the transmission speed.

Referring to FIG. 6, the auxiliary lever 3 is rotated in a clockwise direction and the spring 29 is biasing the auxiliary lever 3 in the left hand direction while the spring 20 is biasing the rod 17 in the left hand direction and the pawl 13 to cause the pawl to engage the tooth 50 of the ratchet 13. As the auxiliary lever 3 is rotated in the clockwise direction it engages the stop 47 and simultaneously has carried the shift lever 2 in a clockwise position to shift the transmission down one speed ratio. When the auxiliary lever 3 is released, the auxiliary lever returns to the neutral position and the pawl 13 returns to the neutral position by the force of springs 29 and 20 respectively, as shown in FIG. 1.

The operation of the device will be described in the following paragraphs.

Referring to FIGS. 1, 2 and 3, the invention is generally illustrated. The shift lever 2 is pivoted on its axis defined by the pin 4 to one of the selected positions indicated which include reverse, neutral and seven speeds forward. The shift lever 2 may be manually shifted from one speed ratio to another by merely pivoting the lever 2 on its axis. Although shifting may sometimes be accomplished satisfactorily in this manner, the close positioning of the gear ratio positions, and also because of the moving tractor and the fact that the operator is not always in a good position to control the shift lever easily, the added refinement of utilizing the auxiliary lever 3 is provided.

The auxiliary lever 3 is pivotally mounted on the same axis as the shift lever 2. The auxiliary lever 2 carries the pawl 13 which is spring biased to a neutral position, as indicated in FIG. 1. The auxiliary lever 3 is normally returned to its neutral position by the springs operating on the auxiliary lever arm 100. When it is desirable to shift the transmission, the auxiliary lever 3 is pivoted clockwise or counterclockwise, depending on whether the shift position is to increase or decrease the speed ratio of the transmission. To shift a vehicle to a higher speed the lever 3 is moved in a counterclockwise direction. The auxiliary lever 3 moves against the biasing forces of the spring 33 connected to the lever arm 100 and also against the biasing force of the spring 24 operating on the pawl 13. The spring operating on the pawl 13 pivots the pawl on the lever 3 causing it to move downwardly to a position as shown in FIG. 5. In this position the lever engages the ratchet 9 and through the pawl 13 causes the ratchet to pivotally rotate with the shift lever 2. Since the ratchet 9 is connected to the shift lever 2, the shift lever 2 is also carried in this direction. The auxiliary lever 3, however, can only rotate in the counterclockwise direction until it engages the stop 48. At this point the shift lever 2 has advanced one increment or one speed ratio as indicated on the panel 101 on top of the control console. The auxiliary lever 3 is then released and the spring 33 returns the lever 3 to its neutral position as shown in FIG. 1. Simultaneously the spring 24 connected to the rod 17 and pawl 13 return the pawl to its normal centered position, as shown in FIG. 1.

Similarly, if the shift lever 2 is to be shifted to a lower speed ratio, the auxiliary lever 3 is pivoted in a clockwise direction and the springs cause the pawl to position itself as shown engaging one of the teeth on the ratchet 9. The continued clockwise rotation will carry the shift lever 2 to shift it down one speed ratio and then the auxiliary lever engages the stop 47. Accordingly, the auxiliary lever 3 is released and returns to its normally neutral position, as indicated in FIG. 1.

The embodiments of the invention in which an exclusive property or privilege is claimed are defined as follows:

1. A dual lever transmission shifting mechanism comprising, a shift lever having means for manually shifting a transmission through a sequence of gear ratios, an auxiliary lever for manually shifting said shift lever, means pivotally supporting said levers on a common axis, a clutching means connected between said levers engageable upon movement of said auxiliary lever in either of two directions including a clutching element on said auxiliary lever including means biasing said clutching element to a center position when said auxiliary lever is in a neutral position and biasing said clutch engaging element to clutch engaging positions when said auxiliary lever is shifted to either side of neutral, stop means limiting the movement of said auxiliary lever in either direction from the center position, resilient means connected to said auxiliary lever to normally return said auxiliary lever to the neutral position upon release of said auxiliary lever to thereby provide incremental shifting movement of said shift lever upon actuation of said auxiliary lever.

2. A dual lever transmission shifting mechanism as set forth in claim 1 wherein said clutching means includes a ratchet on said shift lever, said clutching element selectively engaging said ratchet for shifting of said shift lever.

3. A dual lever transmission shifting mechanism as set forth in claim 1 wherein said stop means is integral with said means supporting said levers for limiting the forward and rearward movement of said auxiliary lever when said auxiliary lever is operated.

4. A dual lever transmission shifting mechanism as set forth in claim 1 wherein said clutching means includes a quadrant defining a ratchet connected to said shift lever, said clutching element defines a pawl carried on said auxiliary lever for selectively engaging said ratchet.

5. A dual lever transmission shifting mechanism as set forth in claim 1 wherein said resilient means includes a spring biasing said auxiliary lever to a normally neutral position.

6. A dual lever transmission shifting mechanism as set forth in claim 1 wherein said stop means includes a control panel defining a slot for receiving said auxiliary lever, means defining the ends of said slot to operate as said stop means.

7. A dual lever transmission shifting mechanism as set forth in claim 1 wherein said resilient means includes a link pivotally connected to said auxiliary lever, a link supporting means, springs resiliently biasing said link to return said auxiliary lever to a normally neutral position.

8. A dual lever transmission shifting mechanism as set forth in claim 1 wherein said clutching means includes a ratchet carried on said shift lever, said clutching element includes a pawl, means pivotally supporting said pawl on said auxiliary lever, a spring normally biasing said pawl to a centered position on said auxiliary lever for selectively engaging said pawl with said ratchet when said auxiliary lever is pivoted from neutral.

9. A dual lever transmission shifting mechanism as set forth in claim 1 wherein said means pivotally supporting said levers on a common axis includes a shaft, a control console defining slots for receiving said levers permitting pivotal movement of said levers.

10. A dual lever transmission shifting mechanism as set forth in claim 1 wherein said means pivotally supporting said levers includes a pivotal support means supporting said levers for pivotal movement about a common axis in laterally spaced positions relative to each other, said clutching means includes a ratchet integral with said shift lever, said auxiliary lever includes pivotal supporting means for said clutching element for selectively engaging said ratchet for rotating said shift lever sequentially upon pivotally moving said auxiliary lever.

* * * * *